(12) United States Patent
Burlica et al.

(10) Patent No.: US 7,919,053 B2
(45) Date of Patent: Apr. 5, 2011

(54) PULSED GLIDING ARC ELECTRICAL DISCHARGE REACTORS

(76) Inventors: Radu Burlica, Iasi (RO); Bruce R. Locke, Tallahassee, FL (US)

(*) Notice: Subject to any disclaimer, the term of this patent is extended or adjusted under 35 U.S.C. 154(b) by 992 days.

(21) Appl. No.: 11/749,945

(22) Filed: May 17, 2007

(65) Prior Publication Data

US 2007/0272543 A1 Nov. 29, 2007

Related U.S. Application Data

(60) Provisional application No. 60/808,749, filed on May 26, 2006.

(51) Int. Cl.
*B01J 19/08* (2006.01)
(52) U.S. Cl. .............. 422/186.21; 588/301; 204/178
(58) Field of Classification Search ............. 422/186.21; 588/301; 204/178
See application file for complete search history.

(56) References Cited

U.S. PATENT DOCUMENTS

| | | | |
|---|---|---|---|
| 4,801,435 | A | 1/1989 | Tylko |
| 6,238,629 | B1 | 5/2001 | Barankova et al. |
| 6,524,538 | B2 | 2/2003 | Barankova et al. |
| 2006/0124445 | A1 | 6/2006 | Labrecque et al. |

OTHER PUBLICATIONS

Czernichowski et al. "Zapping VOCs with a discontinuous electrical arc", CHEMTECH, (1996), vol. 26, No. 4, pp. 45-49.
Ching et al. "*Escherichia coli* Disinfection by Electrohydraulic Discharges", Environ. Sci. Technol., (2001), vol. 35, pp. 4139-4144.
Yan et al. "Plasma chemical degradation of phenol in solution by gas-liquid gliding arc discharge", Plasma Sources Sci. Technol., (2005), vol. 14, pp. 637-644.
Burlica et al. "Formation of reactive species in gliding arc discharges with liquid water", Journal of Electrostatics, (2006), vol. 64, pp. 35-43.
Czernichowski "Gliding arc. Applications to engineering and environmental control", Pure & Appl. Chem., (1994), vol. 66, No. 6, pp. 1301-1310.

*Primary Examiner* — Kishor Mayekar
(74) *Attorney, Agent, or Firm* — Novak Druce + Quigg LLP

(57) ABSTRACT

A pulsed gliding arc discharge (PGD) reactor includes an ignition coil driven by a pulse generator which is connected to a pair of divergent electrodes fixed by a reactor housing with a fluid inlet and outlet. Hydrogen peroxide and dye degradation can be carried out with a PGD reactor according to the invention with efficiencies that are more than two orders of magnitude greater than a conventional ACG reactor based on the calculated specific energy yield.

9 Claims, 7 Drawing Sheets

(a)

(b)

(c)

(d)

(a)

(b)

(a)

(b)

(a)

(b)

PULSED GLIDING ARC ELECTRICAL DISCHARGE REACTORS

CROSS-REFERENCE TO RELATED APPLICATIONS

The present application claims the priority of U.S. provisional patent application No. 60/808,749, entitled "PULSED GLIDING ARC ELECTRICAL DISCHARGE REACTORS," filed May 26, 2006. The foregoing is incorporated herein by reference in its entirety.

STATEMENT REGARDING FEDERALLY SPONSORED RESEARCH OR DEVELOPMENT

Not applicable.

FIELD OF THE INVENTION

A pulsed gliding arc electrical discharge reactor that is useful for chemical transformations in liquids and gases.

BACKGROUND OF THE INVENTION

In order to degrade organic pollutants in aqueous solutions a number of advanced oxidation methods such as direct Fenton's reactions, electrochemical methods, DC corona discharge, pulse corona discharge, photocatalysis, and UV photolysis have been applied. Gliding arc or glidarc technology has been demonstrated to be effective at removing organic compounds from aqueous solutions and gases. A gliding arc is an electrical discharge formed between two or more thin "knife-edge" divergent electrodes with a high velocity (>1 m/s) gas flowing between the electrodes to prevent sparking. The electrical discharge is formed in the gas phase between two or three divergent electrodes at the smallest gap between the electrodes and the discharge spreads as it glides along diverging electrode edges with an increasingly larger gap until it dissipates as it clears the electrodes. The gas flow maintains a near non-thermal characteristic of the plasma. This discharge leads to the formation of positive ions, negative ions, electrons and other chemically active species. Usually one or two high voltage AC transformers energize the gliding arc reactors (ACG). Although, nearly all previous work with the gliding arc discharge has used AC power, in early studies DC voltage was examined using a high voltage, 3000 V, obtained by rectifying a secondary voltage of a transformer at 50 Hz. The usual AC power supply uses the alternating voltage of the high voltage transformer's secondary, which makes it more reliable and robust then the DC power supply that uses high voltage diodes to rectify the voltage. Both configurations have significant energy losses by thermal effect.

Gliding arc discharges have been investigated as a potential technology for gas phase pollution treatment and for liquid phase pollution treatment. While fundamental studies of gas phase gliding arc discharges have been conducted, a detailed understanding of how to apply gliding arc technology for water treatment is still evolving. One mode of operation is to apply the gliding arc above a liquid solution, generally water, whereby the high-velocity gas and some regions of the plasma impinge upon the liquid surface causing reactive species formed in the gas phase to transfer into the liquid and to possibly form reactive species in the liquid or liquid-gas interface. Measurements of OH radicals and NO formed in humid air gliding discharges and the analysis of the pH changes induced in the liquid phase below the discharge from nitrates formed in humid air plasma have been conducted.

An alternative electrode configuration has been examined where the liquid is sprayed through the plasma zone. Since the efficiency of aqueous solution treatment by gliding arcs depends on the gas-liquid interfacial contact area between the solution treated and the plasma zone, spraying the solution via a special two-way nozzle directly into the plasma is an effective method to enhance liquid phase treatment using a gliding arc. This alternate configuration has been shown to enhance dye decolorization beyond that using a reactor configuration with the discharge over a planar water surface. Also in contrast to the discharge above water, when water is sprayed through the discharge with oxygen as the gas, significant amounts of hydrogen peroxide have been formed.

Many other technologies exist for the production of hydrogen peroxide. For example, hydrogen peroxide is made industrially in very large-scale chemical processes that require large quantities of chemical feedstocks. However, there are many applications where small-scale systems and where generation using only readily available materials (water, oxygen, electricity) are of interest. Other competing technologies for the small-scale generation include electrochemical processes. Those electrochemical processes require more complicated membrane and electrode systems than does gliding arc technology. The gliding arc reactor can produce the hydrogen peroxide directly in the spray and it uses only water, oxygen, and electricity. Gliding arc technology permits the use of small reactors and power supplies that are portable and easy to construct.

Ultimately, the practical use of gliding arc technology to promote chemical transformations, such as the removal of organic pollutants in water or the generation of hydrogen peroxide, other reactive oxygen species, or reactive nitrogen species for treatment of potentially contaminated foods, depends on the efficiency that can be achieved. The efficiency can be measured as the specific energy yield of the chemical conversion of interest. It is a goal of the present invention to improve significantly the efficiency of a gliding arc discharge reactor.

SUMMARY OF THE INVENTION

The invention is directed to a pulsed plasma gliding arc discharge reactor that has a housing with at least one inlet to direct a gas or a gas and liquid mixture, a gas comprising fluid, to a plasma region that is generated at the discharge between two or more divergent electrodes supported by the housing where the electrodes are connected to a pulsed power supply and an outlet from the housing. The pulsed power supplied to the electrode can be from an inductive coil, such as an ignition coil, where the coil is driven from a power supply. The reactor housing is preferably electrically non-conductive. The gas-liquid inlet can be a two-way nozzle which can be a plain orifice pressure atomizer, a pressure swirl pressure atomizer, a gas assist gas liquid atomizer, or gas blast gas liquid atomizer so that a sufficient velocity of the gas-liquid mixture can maintain the plasma.

The invention is also directed to a method for the chemical transforming of at least one component of a gas or gas and liquid mixture by spraying the gas or the gas and liquid mixture into a plasma generated in a pulsed gliding arc discharge. The discharge can be formed between divergent electrodes connected to an inductive coil driven by a pulsed power supply. The chemical transformation can be the generation of hydrogen peroxide or hydrogen from water. The chemical transformation can be the degradation of an organic or inorganic pollutant in water.

DETAILED DESCRIPTION

Figure 1:
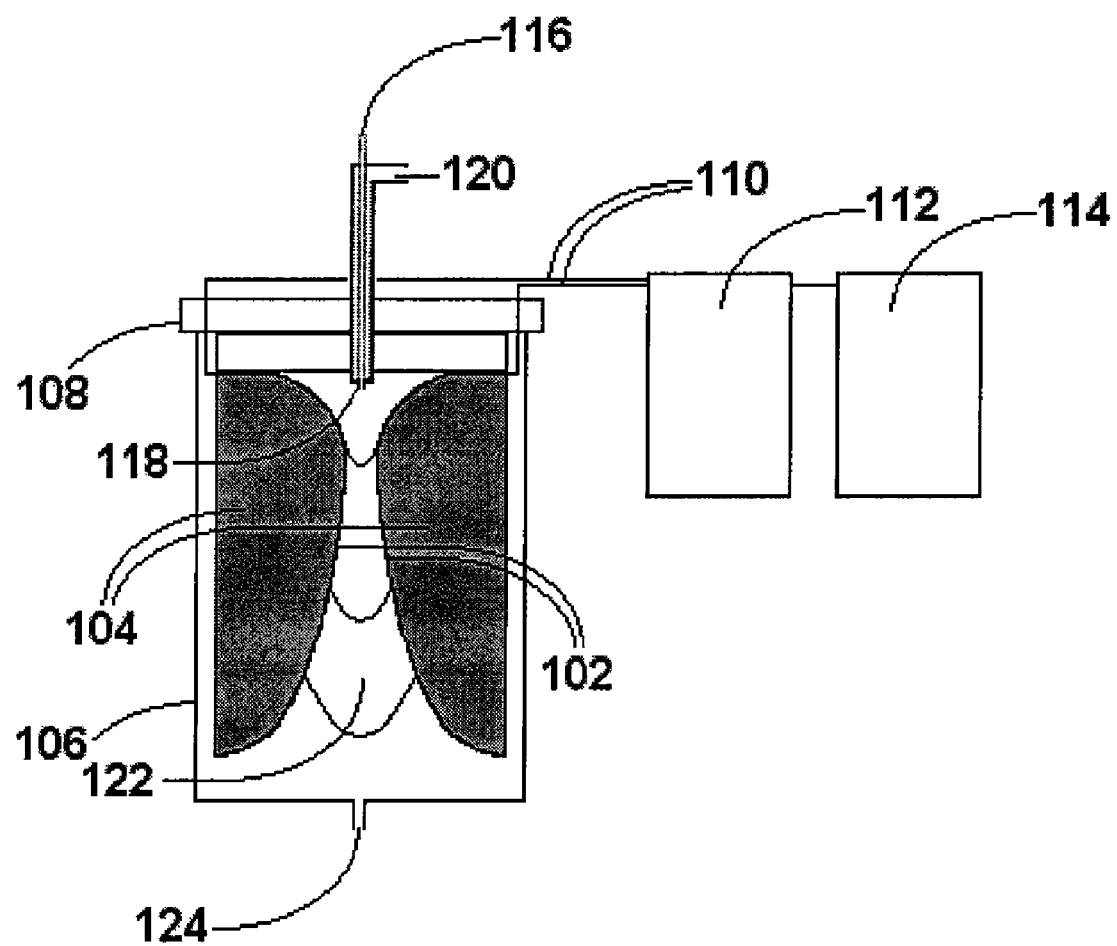
FIG. 1 shows an exemplary gliding arc reactor configuration as used in the experiments for determining the profile and efficiency of the present invention.

During the study of gliding arc technology it was discovered that a dramatic increase in the efficiency was possible by changing the mode of the electrical discharge. Surprisingly, it was discovered that by using a pulsed power supply to produce a gliding arc discharge plasma (PGD), the energy yield for the destruction of an organic blue dye in the PGD reactor was approximately 150 times higher than in the ACG reactor with Ar carrier and the energy yields for the formation of hydrogen peroxide are 270 and 260 times higher in the PGD than the ACG with Ar and $O_2$ carrier gases, respectively. The energy injected into the discharge by the pulsed power supply is also much less than those of early studies of DC gliding arc where the discharge was continuously supplied by the DC voltage.

Gliding arc efficiency can be significantly improved, as indicated by an increase of the specific energy yield of the treatment by providing a pulsed plasma gliding arc in a reactor between two divergent electrodes (PGD). For example, a reactor configuration including an ignition coil driven by a pulsed power supply, instead of the AC high voltage transformer of a traditional glide arc reactor (ACG), leads to significantly higher efficiency in performing chemical transformations. As illustrated in the exemplary FIG. 1, two stainless steel wire divergent electrodes 102 attached to two ceramic insulators 104 of the same shape can be fixed in a reactor body comprising a vessel 106 with a cap 108, which can be constructed of glass or other structural material inert to the chemical species introduced to or formed in the reactor. Other electrode materials and configurations can also be used. For example, in place of the wire attached to the edge of the ceramic insulator as shown here, a solid metal electrode of similar shape as the insulator can be used. Rectangular and cylindrical glass vessels have been used as reactor bodies. The electrodes 102 are connected via wires 110 to an induction coil 112, which can be an automobile ignition coil, driven by a power supply 114 with a pulse generator. The form and appearance of the electrical discharge and the electrochemical reaction can be varied by a changing the electrical discharge parameters such as applied voltage, frequency and power.

Water, a water solution, or another liquid can be introduced to the reactor of exemplary FIG. 1 via a liquid inlet 116 as a spray or a mist via a nozzle 118 with the aid of a working gas provided through a gas inlet 120 into the plasma zone 122 of the glide arc reactor where the gas comprising fluid is subjected to an intense electronic and ionic bombardment. The nature of the working gas can affect the type and quantities of species formed during exposure of the liquid to the discharge in the gliding arc reactor and collected or distributed after exit of the reactor outlet 124. Properties displayed by the glide arc processed water, water solution, or other liquid are affected by the working gas used include pH, conductivity, and the proportions of species such as hydrogen peroxide and nitrogen oxides. The liquid can be passed through the glide arc reactor a single time or multiple passes can be carried out. The quantities of the various species displayed in the treated liquid increase with the number of passes through the glide arc reactor. Multiple reactors can be aligned in series, parallel, or a combination of series and parallel to carry out the desired chemical transformations more rapidly. The working gas can be a noble gas such as argon, or other gas including air, nitrogen, and oxygen, although many other gases and gas mixtures can be used and can be matched to the chemical transformations to be carried out using the gliding arc reactor.

The actual configuration of the pulsed plasma gliding arc reactor can vary in numerous independent manners retaining the critical feature of the pulsed power supply used, such as an ignition coil driven by a pulse generator. The number, shape, and size of the electrodes, housing, inlets, and outlets can all be varied independently or in combination to optimize the efficiency or throughput of the reactor. The gas and liquid flow rates can be varied to optimize the desired efficiency or throughput. The working variation used can be at less than optimal parameters for efficiency or throughput if other factors, such as safety of a specific process, dictate less than optimal conditions. Throughput and efficiency can also be affected by the use of multiple reactors with the reactors combined in series, parallel, or a combination of series and parallel such that high efficiency and high throughput can be achieved.

One important component of the reactor is the liquid inlet which is preferably a nozzle. The nozzle can inject a non-pressurized liquid stream into a high velocity but ambient pressure gas stream, as is the type used in the examples that follow below where a peristaltic pump was used to inject the liquid. A nozzle system can be used to achieve a liquid-droplet gas stream velocity of about 60 m/s or more which permits the achievement of a stable gliding arc discharge. Other nozzle systems that can be used to achieve acceptable liquid particle streams are pressure atomizers and gas-liquid atomizers, illustrated in FIG. 2.

Figure 2:
FIG. 2 shows the basic design of four nozzles that can be employed in the practice of the invention: (a) plain orifice pressure atomizer; (b) pressure swirl pressure atomizer; (c) gas assist gas liquid atomizer; and (d) gas blast gas liquid atomizer.
Figure 2:
Figure 2:
Figure 2:
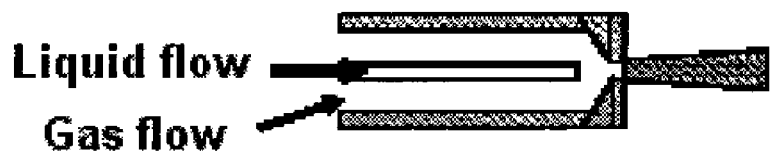

A simple pressure atomizer, a plain orifice atomizer, as shown in FIG. 2(ba) can form drops of about 200 to about 500 μm at velocities of about 25 to about 45 m/s at low pressure and at velocity in excess of 100 m/s, at high pressures of about 5 MPa. A constriction in the injection tube coupled with a pump to pressurize the liquid can be used to produce a narrow conical region containing the spray with a relatively coarse particle size distribution. A second pressure atomizer that can be used in the invention is a pressure swirl atomizer, shown in FIG. 2(b). Again only liquid injection occurs but the internal geometry of the nozzle provides for a finer particle distribution in the spray. These pressure atomizers are highly reliable, producing highly uniform sprays where a range of droplet sizes and velocities can be realized by control of the pressure. Both pressure atomizers can provide a high velocity stream (>100 m/s) of atomized liquid vapor droplets that can sufficiently stabilize the plasma discharge (i.e. prevent sparking) and enhance reactive species formation.

The second general type of atomizer that can be used in the present invention include gas assist and gas blast atomizers, shown in FIG. 2(c) and 2(d), respectively. These atomizers use the kinetic energy of a flowing gas to break up the liquid stream into droplets. The gas assist atomizer keeps the amount of gas used to a minimum and the gas blast atomizer uses larger amounts of gas. These gas-liquid atomizers provide fine particle size droplets. Although gas blast atomizers are limited to velocities of about 120 m/s, gas assist atomizers can exceed this value.

The distance from the nozzle to the plasma zone can be optimized for a given nozzle such that the distance from the nozzle to the plasma zone is large enough for sufficient atomization but short enough to achieve a sufficiently high density of the spray in the plasma. The proper distance can be determined empirically or calculated for any given nozzle, liquid viscosity, and pressures of the liquid and gasses.

The efficiency of any given gliding arc reactor can be evaluated by the calculation of the specific energy yield for a given chemical transformation. One goal of the present invention is to efficiently produce hydrogen peroxide, $H_2O_2$ from water, and the specific energy yield for this transformation is given by equation (1):

$$G = 60[H_2O_2]V_0 M_{H2O2} Q_w / 1000 n P V_0 \quad (1)$$

where:
G is the specific energy yield in g/kWh
$[H_2O_2]$ is the hydrogen peroxide concentration in mM
$M_{H2O2}$ is the molecular mass of hydrogen peroxide in g/M
$Q_w$, is the water flow rate in mL/min
P is the power discharge in W
$V_0$ is the volume of the water treated in the reactor in L. In the example below $V_0 = 0.2$ L
n is the number of passes of the water through the reactor Hence, the ability of the present invention to improve significantly the efficiency of a glide arc reactor by using a pulsed plasma gliding arc can be evaluated by the increase of the specific energy yield for the chemical transformation such as that given above for the production of hydrogen peroxide.

EXAMPLES

The present invention is further illustrated by the following specific Examples, which should not be construed as limiting the scope or content of the invention in any way.

The pulsed plasma gliding arc reactor between two divergent electrodes (PGD) and its improved performance over the common AC high voltage glide arc reactor (ACG) is illustrated by the following non-limiting examples. For all examples the ACG and PGD reactors were constructed as described below. Other sizes, shapes, power sources and configurations can be used and will be obvious to those of ordinary skill in the art.

Figure 3:
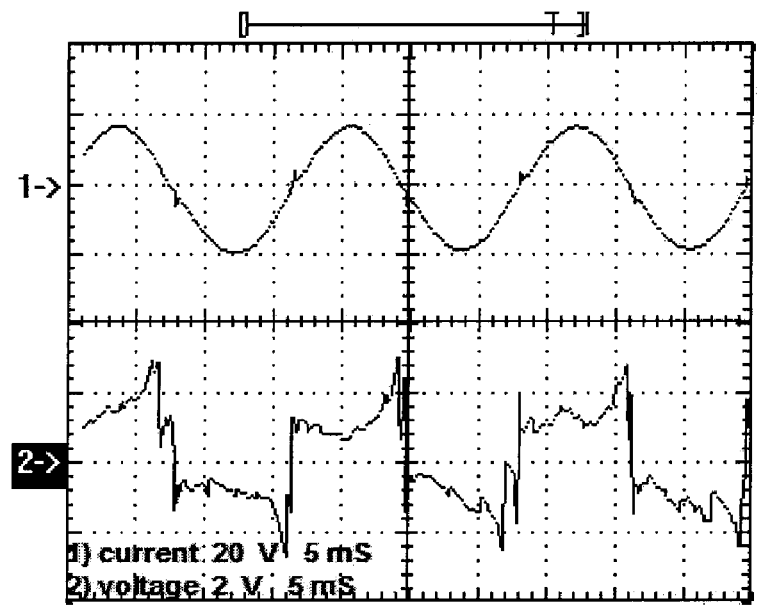
FIG. 3 shows plots of the current and voltage wave forms for (a) the ACG reactor and (b) the pulsed gliding arc discharge (PGD) reactor used in the Examples.
Figure 3:
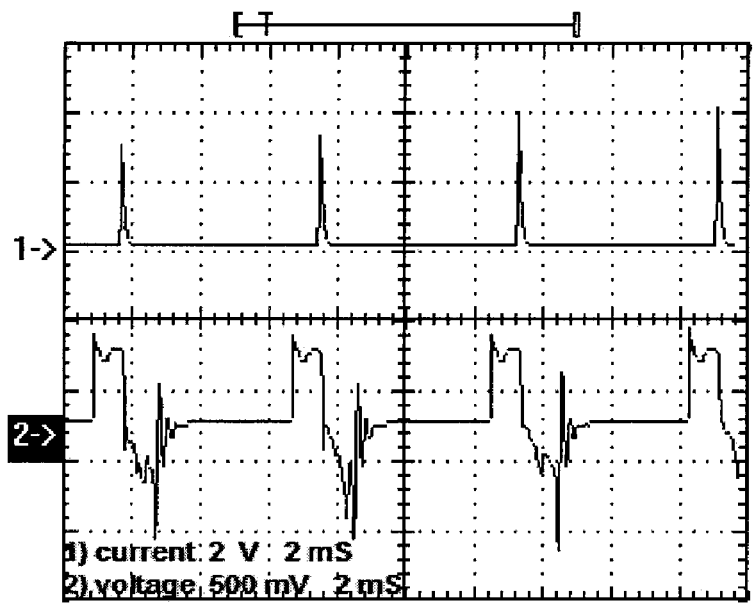

Glide arc reactors were constructed with the configuration of FIG. 1, where the reactor body was prepared using a glass cylindrical vessel of a diameter of 50 mm and a height of 70 mm, into which were placed two 1 mm diameter stainless steel wire divergent electrodes, each electrode being attached to two ceramic insulators. In one reactor (ACG) the electrodes were connected to an AC high voltage transformer with a magnetic shunt (P=700 W, $U_0$=12 kV, 60 Hz). The average electrical power of the ACG discharge calculated for 4 points was found to be approximately 150 W, with a measurement error of approximately 10%. The average power was used for determinations of the efficiency of the reactor. The wave form of the current and voltage are shown in FIG. 3(a).

In a second reactor (PGD) the electrodes were connected to a pulse power supply (18 W average power in the primary of the ignition coil, 25 kV free of charge, 160 up to 250 Hz with best results obtained in the experiment at 170 Hz), which is an automobile ignition coil, driven by a pulse generator. The average electrical power of the discharge, measured at the electrodes, calculated for 5 pulses was found to be approximately 250 mW, with a measurement error about 15%. The average power was used for efficiency determinations. The wave form of the current and voltage are shown in FIG. 3(b).

Example 1

Water was passed separately through the ACG reactor and the PGD reactor. The water displayed an initial pH of 5 and a conductivity of 10 µS/cm. The working gas was varied using individually air, nitrogen, oxygen and argon for each reactor. A quantity of 200 mL of water was used for each reactor and multiple passes were made for each 200 mL quantity through each reactor. Measurements of the solution parameters were carried out on the water after each pass.

For both reactors the evolution of the pH was similar. Using the ACG reactor the pH decreased from the initial value of 5 to a value of approximately 2.5 after four passes. Using the PGD reactor, the pH decreased from the initial value of 5 to a value of approximately 3 after four passes. The change in pH did not differ in a significant manner using different working gases.

Figure 4:
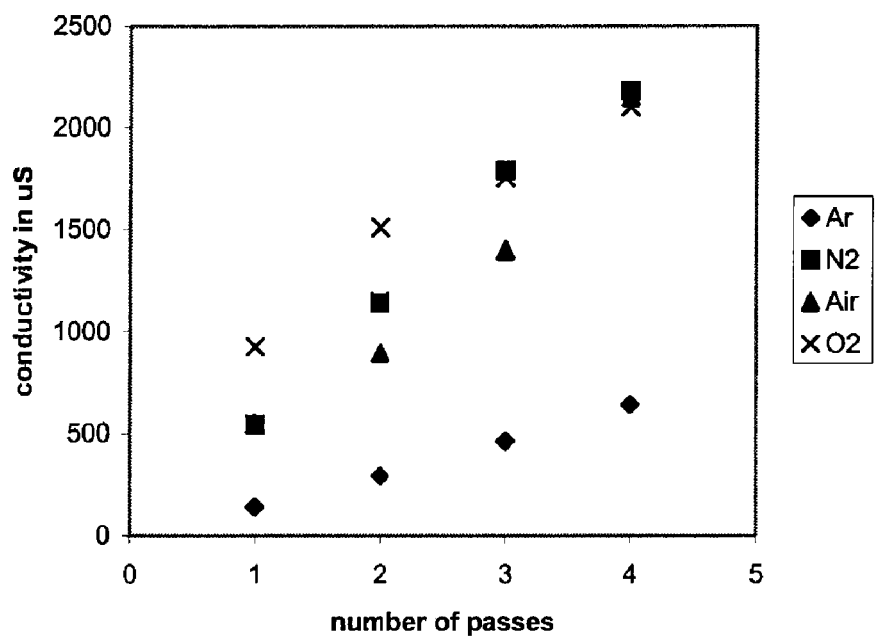
FIG. 4 shows plots of the evolution of the conductivity of water passed through: (a) the ACG reactor and (b) the PGD reactor using various working gases for consecutive passes through the reactor.
Figure 4:
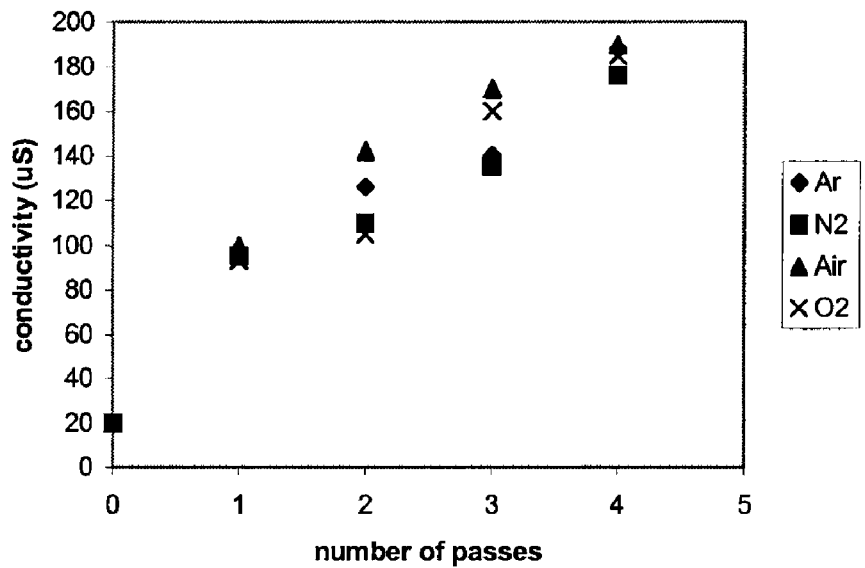

The change in conductivity is shown in FIG. 4. The change in conductivity differed significantly with the two reactors. In the case of the ACG reactor, shown in FIG. 4(a), the conductivity change for the initial and subsequent passes depended on the working gas and the observed rate of change was much lower for the inert gas argon. The conductivity of the water using argon increased from the initial value of 10 to approximately 120 µS/cm after one pass and ultimately achieved a conductivity of approximately 550 µS/cm after four passes. In contrast, the conductivities of the water using nitrogen, air or oxygen increased much more rapidly with a one pass value in excess of 550 µS/cm and a value after four passes of approximately 2100 µS/cm. This conductivity change suggests that the ionized or excited gas species impacting with the water molecules play an important role in the nature and quantity of species formed in water using the ACG reactor.

In the case of the PGD reactor, shown in FIG. 4(b), the conductivity change was much less and was essentially independent of the working gas. As can be seen in FIG. 4(b), the conductivity is approximately 100 µS/cm after a single pass regardless of the working gas and achieves a conductivity of less than 200 µS/cm after four passes through the PGD reactor. This suggests that direct electron impact with the water rather than impact of ionized or excited gas with the water is primarily responsible for the evolution of the conductivity.

Figure 5:
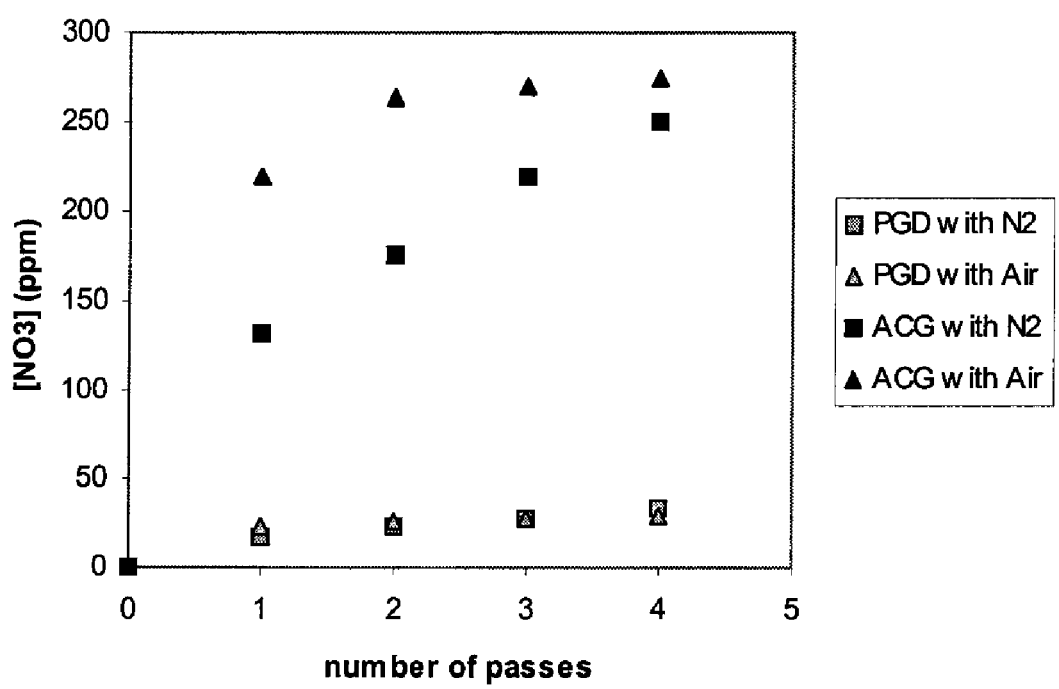
FIG. 5 shows a plot of the generation of $NO_3$ in water using the ACG reactor and PGD reactor with nitrogen and air as the working gases for consecutive passes through the reactor.

This difference in the mode of ionization is also indicated by the difference in the generation of nitrates using the ACG and PGD reactors when the working gas is nitrogen or air. As can be seen in FIG. 5 very low quantities of nitrates are formed using the PGD reactor relative to the significantly higher quantities formed when the ACG reactor was used. This indicates the additional advantage of using a PGD reactor over an ACG reactor where nitrogen oxide species are preferentially avoided or minimized while using air as the working gas. The gas supplied and other conditions employed with the reactor can be varied to promote the formation of reactive nitrogen species when such species are desired for a particular sterilization application.

Figure 6:
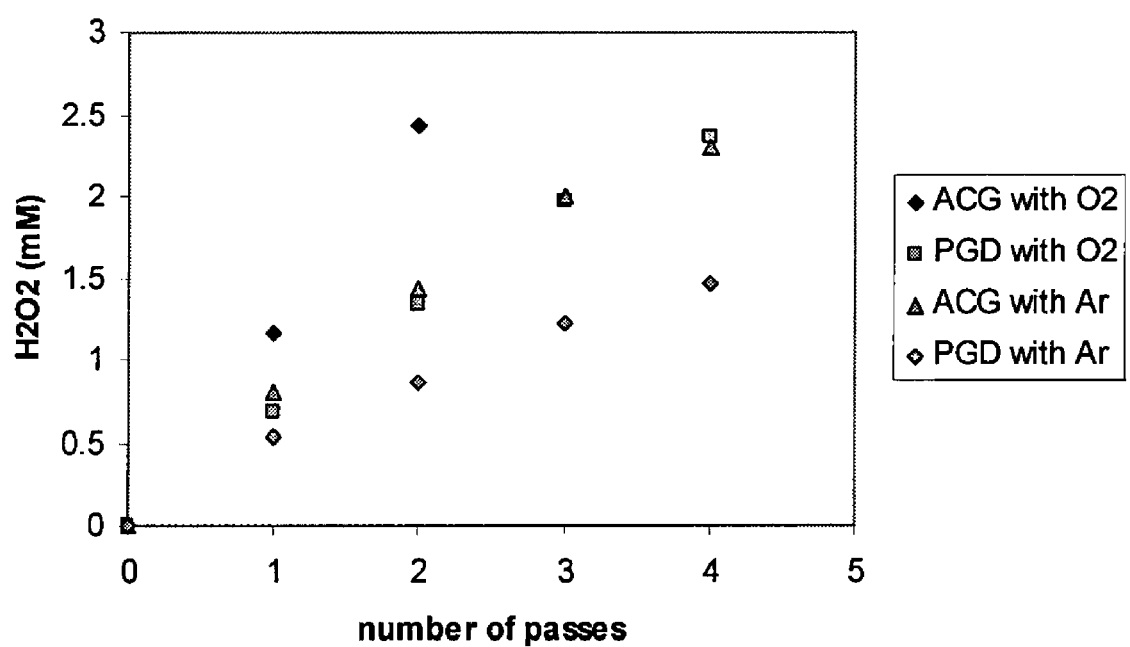
FIG. 6 shows a plot showing the generation of hydrogen peroxide in water using the ACG reactor and PGD reactor with argon and oxygen as the working gases for consecutive passes through the reactor.

The formation of hydrogen peroxide for the ACG and PGD reactors is shown in FIG. 6 for oxygen and argon. As can be seen in FIG. 6, the formation of hydrogen peroxide was similar for the ACG reactor with argon and the PGD reactor with oxygen, was higher with the ACG reactor with oxygen, and lower with the PGD reactor with argon. The specific energy for the production of hydrogen peroxide after two passes is given in Table 1. As can be seen from Table 1, the specific energy is more than 270 times greater (37.5/0.13) for the PGD reactor than for the ACG reactor using argon as the working gas and more than 160 times (54.5/0.21) greater for the PGD reactor using oxygen.

TABLE 1

Specific Energy for Hydrogen Peroxide Production in g/kWh

| Working Gas | Specific Energy (g/kWh) | |
|---|---|---|
| | Argon | Oxygen |
| ACG reactor | 0.13 | 0.21 |
| PGD reactor | 37.5 | 54.5 |

Example 2

Figure 7:
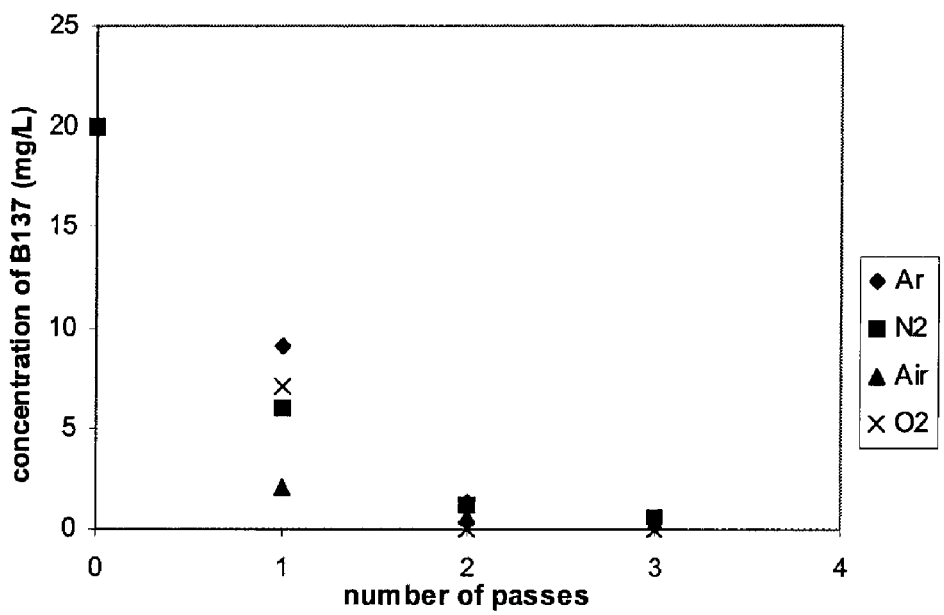
FIG. 7 shows plots of the decrease in the concentration of a blue dye in aqueous solution using: (a) the ACG reactor and (b) the PGD reactor using various working gases for consecutive passes through the reactor.
Figure 7:
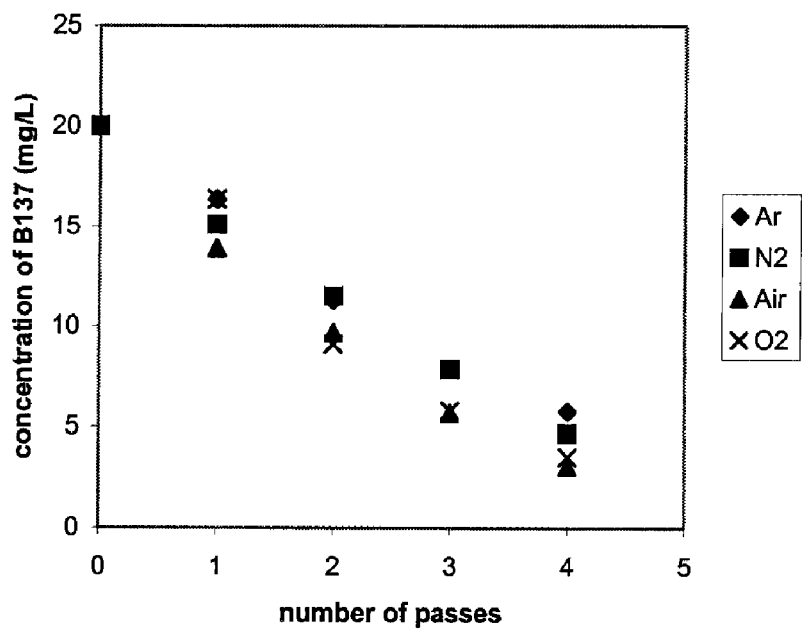

The treatment of aqueous solutions of the pentasodium salt of the dye blue 137,

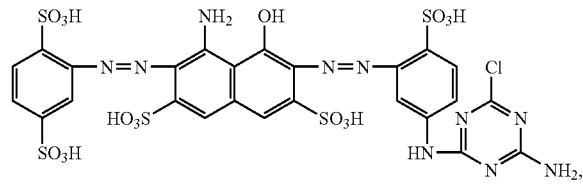

was examined, separately using the ACG reactor and the PGD reactor. The working gas was varied using individually air, nitrogen, oxygen and argon for each reactor. A quantity of 200 mL of a 20 mg/L aqueous blue dye solution was passed multiple times through each reactor. Absorbance measurements of the dye were performed by UV spectroscopy using a Perkin-Elmer/Lambda 3A spectrometer after each pass and the measured absorbance was used to calculate a concentration by mass of the dye. The results of the blue dye degradation are presented in FIG. 7(a) for the ACG reactor and in FIG. 7(b) for the PGD reactor. As can be seen in FIG. 7(a), the degradation of the dye with the first pass was rapid, with at least fifty percent degradation on the first pass for all working gases, but highly dependent on the working gas composition. The degradation was most rapid in air and least rapid in argon. By the second pass little dye remained regardless of the working gas used and almost no dye remained after a third pass for any working gas. After four passes, the dye concentration was 1 mg/L or less. In contrast, the PGD reactor, as shown in FIG. 7(b) showed no significant dependence on the composition of the working gas. The concentration of dye after four passes was 5.5 mg/L using argon and 3 mg/L using air.

A second goal of the present invention is to efficiently degrade organic pollutants and was modeled by the destruction of the blue dye. The specific energy yield for this transformation is given by equation (2):

$$G = 60\Delta[B137]V_0 Q_w / 1000 nPV_0 \quad (2)$$

where:

G, $Q_w$, P, $V_0$, and k are define as in equation (1), and $\Delta[B137]$ is defined by the change in the concentration of the blue dye in mg/L after treatment.

Table 2 below, gives the calculated values for the specific energy for degradation of the dye that was examined by the two-electrode PGD and ACG reactors used in Examples 2, and for comparison, the value for degradation using a corona discharge (disclosed in R. Burlica et al., "Organic Dye Removal from Aqueous Solution by Glidarc Discharges", *J. Electrostatics* 62 (4), 2004, pp. 309-321 and incorporated by reference) is included in Table 2. As can be seen in Table 2, the degradation ability improves by more than two orders of magnitude over that of a two-electrode ACG reactor (5/0.035), and over two times that of a pulsed corona discharge (5/2).

TABLE 2

Specific Energy for Dye Degradation in g/kWh

| Reactor | ACG | Pulsed Corona | PGD |
|---|---|---|---|
| G (g/kWh) | 0.035 | 2 | 5 |

Hence, it has been discovered and demonstrated that a glide arc reactor using a pulsed discharge greatly enhances the efficiency of generating hydrogen peroxide or degrading organic impurities. Other chemical transformations that may be performed using the pulsed gliding arc reactor described above include: hydrogen generation from water, other liquids, including ethanol, and gases; natural gas reformation; gas stream cleaning processes, whereby compounds such as nitrogen oxides, sulfur oxides, carbon oxides, hydrogen disulfide, chlorine, volatile organic compounds or ammonia removal via reactions with liquids or aqueous-based solutions; destruction, inactivation, or sterilization of biological species such as bacteria, viruses, and other organisms on surfaces, in the liquid phase, or in the gas phase; surface treatment using the products of the plasma discharge from various gas-liquid systems or any reaction where a gaseous species can form or react with species in or generated in the liquid phase to produce either a gaseous or solution product.

It is to be understood that while the invention has been described in conjunction with the preferred specific embodiments thereof, that the foregoing description as well as the examples, which followed are intended to illustrate and not limit the scope of the invention. Other aspects, advantages and modifications within the scope of the invention will be apparent to those skilled in the art to which the invention pertains.

We claim:

1. A pulsed plasma gliding arc discharge reactor, comprising:

a housing having at least one inlet and at least one outlet, a plurality of divergent electrodes supported by said housing, a pulsed power supply connected to said electrodes, and wherein said inlets of said housing directs a gas comprising fluid through a region between said divergent electrodes generating a plasma in said region.

2. The reactor of claim 1, further comprising an inductive coil connected between said electrodes and said power supply.

3. The reactor of claim 1, wherein said housing is electrically non-conductive.

4. The reactor of claim 1, wherein said inlet comprises a two-way nozzle.

5. The reactor of claim 4, wherein said nozzle comprises a plain orifice pressure atomizer, a pressure swirl pressure atomizer, a gas assist gas liquid atomizer, or gas blast gas liquid atomizer.

6. A method of chemical transforming at least one component of a gas comprising fluid comprising the steps of:

providing said gas comprising fluid; and spraying said gas comprising fluid into a plasma generated in a pulsed gliding arc discharge, wherein a chemical transformation is effected.

7. The method of claim 6, wherein said discharge comprises the discharge between divergent electrodes connected to an inductive coil driven by a pulsed power supply.

8. The method of claim 6, wherein the chemical transformation comprises the generation of hydrogen peroxide from water.

9. The method of claim 6, wherein the chemical transformation comprises the degradation of an organic or inorganic pollutant in water.

* * * * *